United States Patent
Ranini et al.

(10) Patent No.: US 8,316,641 B2
(45) Date of Patent: Nov. 27, 2012

(54) FEED CIRCUIT FOR SUPPLYING A SUPERCHARGED ENGINE WITH AT LEAST ONE FLUID AND METHOD FOR SUPPLYING SUCH AN ENGINE WITH AT LEAST ONE FLUID

(75) Inventors: Alain Ranini, Rueil Malmaison (FR); Bruno Walter, Colombes (FR)

(73) Assignee: Institut Francais du Petrole, Cedex (FR)

( * ) Notice: Subject to any disclaimer, the term of this patent is extended or adjusted under 35 U.S.C. 154(b) by 975 days.

(21) Appl. No.: 12/090,670

(22) PCT Filed: Oct. 18, 2006

(86) PCT No.: PCT/FR2006/002356
§ 371 (c)(1),
(2), (4) Date: Oct. 10, 2008

(87) PCT Pub. No.: WO2007/045768
PCT Pub. Date: Apr. 26, 2007

(65) Prior Publication Data
US 2009/0217660 A1 Sep. 3, 2009

(30) Foreign Application Priority Data
Oct. 19, 2005 (FR) ...................................... 05 10728

(51) Int. Cl.
*F02B 33/44* (2006.01)
*F02B 29/04* (2006.01)
*F02M 25/07* (2006.01)

(52) U.S. Cl. ......................................... 60/605.2; 60/611

(58) Field of Classification Search .................. 60/605.2, 60/611, 605.1; *F02M 25/07; F02B 29/04*
See application file for complete search history.

(56) References Cited

U.S. PATENT DOCUMENTS

| | | | |
|---|---|---|---|
| 5,937,651 A | 8/1999 | Braun et al. | |
| 6,295,815 B1 | 10/2001 | Bechle et al. | |
| 6,422,222 B1 * | 7/2002 | Arbeiter et al. | 60/605.2 |
| 6,918,251 B2 * | 7/2005 | Yanagisawa et al. | 60/605.2 |
| 6,973,787 B2 * | 12/2005 | Klingel | 60/605.2 |
| 7,313,918 B2 * | 1/2008 | Melchior | 60/605.2 |
| 2005/0199229 A1 | 9/2005 | Eitel et al. | |
| 2010/0180591 A1 * | 7/2010 | Cornwell et al. | 60/605.2 |

FOREIGN PATENT DOCUMENTS

| | | |
|---|---|---|
| DE | 19716566 C1 * | 6/1998 |
| EP | 1 493 907 B1 | 2/2007 |
| FR | 2 853 011 A1 | 10/2004 |
| WO | WO 2004/088115 A2 | 10/2004 |
| WO | WO 2006/122306 A2 | 11/2006 |

* cited by examiner

*Primary Examiner* — Thai Ba Trieu
(74) *Attorney, Agent, or Firm* — Antonelli, Terry, Stout & Kraus, LLP.

(57) ABSTRACT

A circuit for feeding at least one fluid to an internal-combustion engine, notably of Diesel type, includes a circuit (20) for supercharging air to the engine intake, including a supercharging pipe (36), a supercharging device (28) with a compression stage (26) and a compressed air cooling radiator (38), as well as a circuit (22) for recirculating the exhaust gas to the engine intake, including an exhaust gas recirculation pipe (40) and an exhaust gas cooler (46). The feed circuit includes a connecting pipe (50) allowing to connect, upstream from cooler (46), air supercharging circuit (20) and exhaust gas recirculation circuit (22).

5 Claims, 1 Drawing Sheet

FEED CIRCUIT FOR SUPPLYING A SUPERCHARGED ENGINE WITH AT LEAST ONE FLUID AND METHOD FOR SUPPLYING SUCH AN ENGINE WITH AT LEAST ONE FLUID

FIELD OF THE INVENTION

This application is a national stage application of International Application No. PCT/FR2006/002356, which has an international filing date of Oct. 18, 2006, which designated the United States of America and which claims priority of French Patent Application No. 0510728, filed Oct. 19, 2005. The entire disclosures of the above patent applications are hereby incorporated by reference.

The present invention relates to a circuit for feeding at least one gaseous fluid to a supercharged internal-combustion engine, notably of Diesel type, and to a method for feeding at least one gaseous fluid to such an engine.

In this type of engine, the feed circuit allows to feed into the cylinders of the engine either a mixture of air and recirculated exhaust gas, or only air by means of an air supercharging circuit and of a recirculation circuit for recirculating the exhaust gas to the engine intake.

The supercharging circuit usually comprises a pipe connecting an outside air compression device to the engine intake and a compressed air cooling radiator or supercharging air radiator (RAS) arranged on the pipe between the engine intake and the compression device. Generally, the compression device is a compression stage of a turbosupercharger that is linked in rotation to a driving stage, such as a turbine arranged in the exhaust gas stream and driven in rotation under the effect of the exhaust gas by which it is scavenged.

In a conventional exhaust gas recirculation circuit, the exhaust gas resulting from the combustion of the fuel mixture is partly re-injected into the cylinders of the engine. This re-injection allows, after combustion of the fuel mixture mixed with this exhaust gas, to obtain burnt gases that leave the engine with a reduced amount of pollutants such as nitrogen oxides. This exhaust gas recirculation is achieved by connecting the engine exhaust to the intake by means of an EGR (Exhaust Gas Recirculation) pipe. This pipe is provided with a recirculated exhaust gas cooler that allows the temperature of the exhaust gas to be lowered prior to feeding it into the engine cylinders. This pipe is also fitted with a valve, referred to as EGR valve, that allows to control the amount of exhaust gas fed into the cylinders of this engine.

BACKGROUND OF THE INVENTION

During the development of new vehicles, special care is given to the definition of the front face of the vehicle in order to reduce the injury risks that a head-on collision of this vehicle with a pedestrian could involve. One solution consists in limiting the height of this front face but the problem encountered then lies in the dimensioning of the devices arranged in or close to this front face. An example thereof is the supercharging air radiator that consists of a large exchange surface placed in this front face so as to be scavenged by the outside air and that is necessary to cool the large amount of compressed air from the compression stage.

Considering this requirement linked with this heat exchange, current solutions consist in obtaining a compromise between the definition of the front face of the vehicle and the front dimensioning of the supercharging air radiator. This therefore increases the risks of injury in case of collision between the vehicle and a pedestrian, and a loss of performance of the supercharging air radiator.

Another problem linked with a supercharged engine with exhaust gas recirculation is due to cooler fouling. In fact, the exhaust gas that flows through this cooler contains unburnt hydrocarbons (HC) and particles that settle on the exchange walls of the cooler. These deposits penalize the heat exchange of the gas with the cooling fluid and they can, notably in extreme cases of use with a high recirculation rate (of the order of 40 to 50%), clog the exhaust gas circulation channels. In this case, it is necessary to take off the cooler and to clean it manually. This cleaning operation requires taking the vehicle off the road and it involves a cost that is by no means insignificant.

The present invention aims to overcome the aforementioned drawbacks by means of a feed circuit that allows to reduce the size of the supercharging air radiator without decreasing the thermal exchanges required for supercharging air cooling, while allowing the cooler to be cleaned without having to be taken off and without seriously disturbing the running of this engine.

SUMMARY OF THE INVENTION

The present invention therefore relates to a circuit for feeding at least one fluid to an internal-combustion engine, notably of Diesel type, comprising a circuit for supercharging air to the engine intake, including a supercharging pipe, a supercharging device with a compression stage and a compressed air cooling radiator, as well as a circuit for recirculating the exhaust gas to said engine intake, comprising an exhaust gas recirculation pipe and an exhaust gas cooler, characterized in that the feed circuit comprises a connecting pipe allowing to connect, upstream from the cooler, the air supercharging circuit and the exhaust gas recirculation circuit.

Advantageously, the pipe can connect the radiator upstream to the cooler upstream.

The pipe can also connect the radiator downstream to the cooler upstream.

Preferably, the pipe can be provided with a flow control valve.

The air supercharging circuit can comprise a flow control valve.

The invention also relates to a method for feeding at least one fluid to an internal-combustion engine, notably of Diesel type, comprising an air supercharging circuit with an outside air compression device, as well as a compressed air cooling radiator and an exhaust gas recirculation circuit with an exhaust gas cooler, characterized in that it consists, for half load and full load running of the engine, in passing part of the compressed air through the radiator and in passing simultaneously the other part of this compressed air through the cooler.

This invention also relates to a method for feeding at least one fluid to an internal-combustion engine, notably of Diesel type, comprising an air supercharging circuit with an outside air compression device, as well as a compressed air cooling radiator and an exhaust gas recirculation circuit with an exhaust gas cooler, characterized in that it consists, for half load and full load running of the engine, in passing the compressed air through the radiator, then through the cooler.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
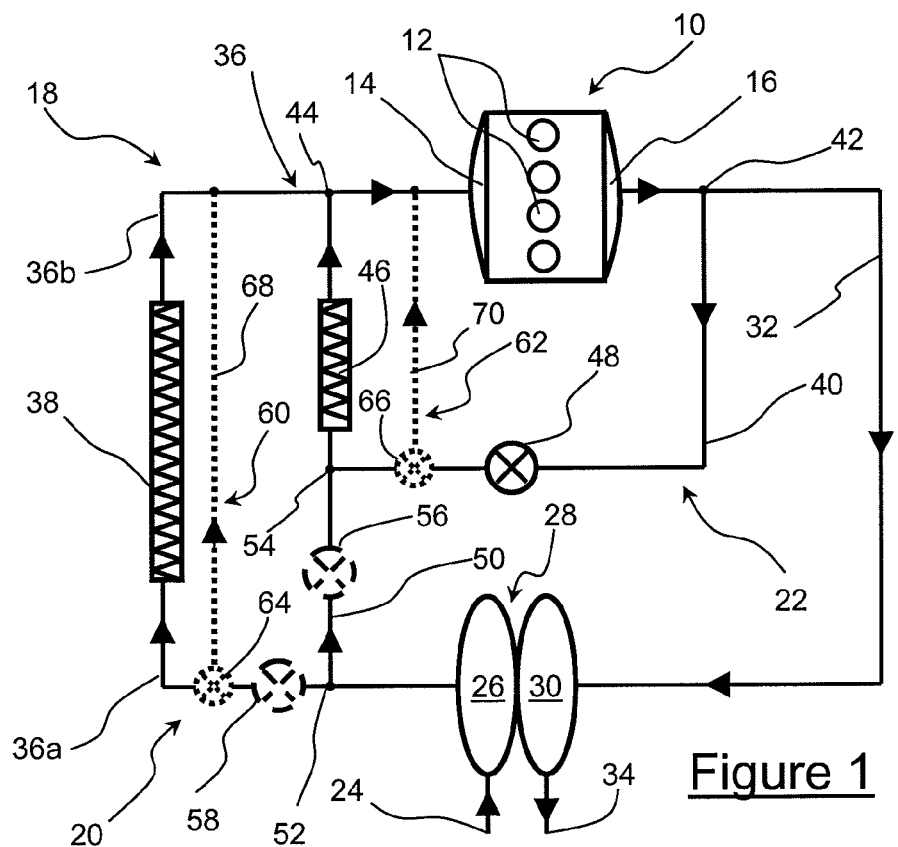
FIG. 1 diagrammatically shows an internal-combustion engine with the feed circuit according to the invention.

In FIG. 1, internal-combustion engine 10, notably of Diesel type, comprises at least one cylinder 12 within which combustion of a fuel mixture takes place, an intake manifold 14 and an exhaust manifold 16.

Intake manifold 14 is supplied with at least one gaseous fluid (supercharged or non-supercharged air with or without recirculated exhaust gas) by a feed circuit 18 that comprises an air supercharging circuit 20 and an exhaust gas recirculation circuit 22.

The air supercharging circuit starts at an outside air inlet 24 and ends at intake manifold 14. Outside air inlet 24 opens onto a compression stage 26 allowing this outside air to be compressed. In the example shown in the figures, this compression stage is the compressor of a turbosupercharger 28 with a turbine 30 connected by a transmission shaft (not shown) to the compressor. The turbine is driven in rotation by the exhaust gas resulting from the combustion of the fuel mixture in the cylinders and flowing from exhaust manifold 16. This gas then circulates through a pipe 32 that starts at this manifold and ends at the turbine. After passing through this turbine, the exhaust gas is discharged into the exhaust line through an outlet 34. The compressed air leaving compressor 26 is sent through an air supercharging pipe 36 into intake manifold 14. Conventionally, a compressed air cooling radiator 38, more commonly referred to as supercharging air radiator (SAR), is arranged on pipe 36 between intake manifold 14 and compressor 26. The position of this radiator thus divides supercharging air pipe 36 into an upstream supercharging air pipe 36a between the compressor and the radiator and a downstream pipe 36b between this radiator and the intake manifold.

The terms upstream and downstream refer to the constituent parts of the circuit considered that are arranged before and after the element concerned in relation to the direction of flow of the fluid(s) as shown in the figures.

Exhaust gas recirculation circuit 22 comprises an exhaust gas recirculation pipe 40 (more commonly referred to as EGR pipe) that starts at a bypass 42 of exhaust gas pipe 32 and ends either at the intake manifold or at a point 44 of supercharging air downstream pipe 36b, as shown in FIG. 1. This EGR pipe carries a recirculated exhaust gas cooler 46 and a valve 48 referred to as EGR valve allowing to control the amount of exhaust gas circulating in the EGR pipe. This valve is arranged on the EGR pipe portion located between exhaust manifold 16 and cooler 46.

As better visible in FIG. 1, the feed circuit also comprises a connecting pipe 50 between the air supercharging circuit and the exhaust gas recirculation circuit. More precisely, this connecting pipe allows to connect a point 52 of air supercharging upstream pipe 36a to a junction point 54 of the part of pipe 40 arranged upstream from cooler 46 and downstream from EGR valve 48.

This location of the connecting pipe thus allows to operate the supercharging air radiator in parallel with the recirculated exhaust gas cooler to achieve cooling of the compressed air from compressor 26.

Preferably, the connecting pipe is provided with a flow control valve 56 allowing to control the flow rate of the compressed air flowing through cooler 46. The part of the upstream pipe 36a located between junction point 52 and the supercharging air radiator is also provided with a flow control valve 58 allowing to control passage of the compressed air in radiator 38.

When the engine runs under half load or full load conditions, it is not necessary to require recirculation of the exhaust gas to the engine intake because the combustion of the fuel mixture in cylinders 12 is such that the pollutants discharged at the exhaust meet the anti-pollution standards.

In this case, EGR valve 48 is in closed position, thus preventing passage of the gas into the cooler, and flow control valves 56 and 58 are in open position. In this configuration, the exhaust gas coming from exhaust manifold 16 and circulating in pipe 32 drives turbine 30 in rotation and it is thereafter discharged through outlet 34. This turbine drives compressor 26 so as to compress the outside air flowing in through inlet 24. The compressed air leaving the compressor, at a high temperature as a result of the compression, circulates on the one hand in upstream pipe 36a and, on the other hand, in connecting pipe 50 and in the portion of pipe 40 located between point 54 and the cooler inlet. Part of the compressed air is thus cooled by radiator 38 and the other part is cooled by exhaust gas cooler 46. The cooled compressed air leaving the radiator and the cooled compressed air leaving the cooler then meet at junction point 44 prior to being sent to intake manifold 14. From this manifold, the cooled compressed air is fed into cylinders 12 so as to be mixed with a fuel and to achieve combustion of the fuel mixture.

Owing to the additional cooling power (of the order of 5 to 10 KW) provided by cooler 46 to lower the temperature of the compressed air, it is possible to reduce the dimensions of radiator 38 while keeping the final exchange performances and the temperature of the compressed air in the manifold that were obtained beforehand by means of conventional feed circuits. The span of the front face of the vehicle can therefore be reduced without penalizing cooling of the supercharging air.

Advantageously, this configuration is turned to account by systematically achieving an exhaust gas cooler cleaning. As mentioned above, the compressed air that flows through this cooler is at a high temperature, of the order of 150° C. to 180° C. This temperature is sufficiently high to evaporate the soluble fractions of the particles settled on the exchange walls of the cooler so that they disintegrate. Then, under the effect of the high velocity of the compressed air circulating in the cooler, these disintegrated particles come off the exchange walls and are carried along by the cooled compressed air to the engine intake from where they are fed into the cylinder so as to be burned during combustion of the fuel mixture.

More advantageously, this cleaning operation can be carried out faster by action on flow control valves 56 and 58. Thus, these valves can be controlled in such a way that valve 58 is temporarily in an intermediate closed position, or even in total closed position, and valve 56 in fully open position. The amount of air passing through the cooler is therefore greater, which can only accelerate cleaning of this cooler.

When the engine runs under low load conditions requiring recirculated exhaust gas intake, valve 56 is in closed position of connecting pipe 50, valve 58 is in open position of pipe 36a and opening of EGR valve 48 is actuated according to the desired combustion conditions of the fuel mixture in cylinders 12.

Under such running conditions, part of the exhaust gas flowing from manifold 16 is sent through pipe 40 to point 44 after being cooled by cooler 46. The air reaching this point after passage through radiator 38 can be either air at ambient pressure (in case of inactivity of the compressor, notably during engine idling phases) or air slightly compressed by the compressor. From this point, a mixture of air and of exhaust gas is thus sent to the intake manifold.

Figure 2:
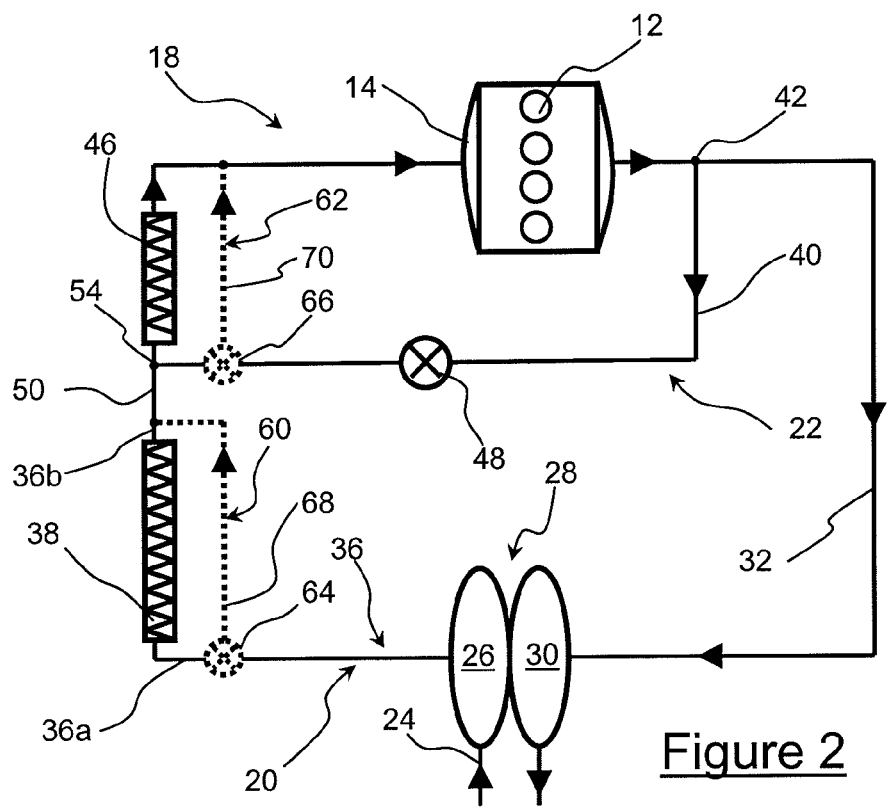
FIG. 2 illustrates an internal-combustion engine with a variant of the feed circuit of FIG. 1.

FIG. 2 shows a variant of FIG. 1 and it therefore comprises the same reference numbers for the elements common to the two figures.

This variant is distinguished from FIG. 1 in that connecting pipe 50 allows to operate cooler 46 in series with radiator 38 so as to provide cooling of the compressed air when the engine runs under medium load and high load conditions.

Air supercharging circuit 20 of feed circuit 18 of this variant therefore comprises an outside air inlet 24, an air compressor 26 that is part of a turbosupercharger 28, an air supercharging pipe 36 and a supercharging air radiator 38 dividing pipe 36 into an upstream pipe 36a and a downstream pipe 36b.

Exhaust gas recirculation circuit 22 comprises an exhaust gas recirculation pipe 40 that starts at bypass 42 of exhaust gas pipe 32 and ends at intake manifold 14, a recirculated exhaust gas cooler 46 and an EGR valve 48.

As mentioned above in connection with FIG. 1, the feed circuit of this variant also comprises a connecting pipe 50 between the air supercharging circuit and the exhaust gas recirculation circuit.

As better visible in FIG. 2, this connecting pipe allows to connect air supercharging downstream pipe 36b to junction point 54 of the part of pipe 40 located upstream from cooler 46 and downstream from EGR valve 48.

As already explained in connection with FIG. 1, when the engine runs under half load or full load conditions, EGR valve 48 is in closed position preventing passage of the gas into cooler 46. The air compressed by compressor 26 circulates in upstream pipe 36a and radiator 38, then through downstream pipe 36b at a lower temperature than at the compressor outlet. The compressed air thus cooled is then sent through connecting pipe 50 to junction point 54, it flows through cooler 46 and undergoes another temperature decrease. At the cooler outlet, the compressed air that has undergone a sort of "overcooling" by passing through cooler 46 is sent to intake manifold 14, from where this compressed air is fed into cylinders 12 in order to be mixed with a fuel and to perform combustion of the fuel mixture.

Thus, by means of this "overcooling", it is possible to reduce the dimensions of radiator 38 while keeping the thermal performances required to lower the temperature of the compressed air to a level required to feed it into cylinders 12.

Similarly, it will be possible to clean cooler 46 without having to take it off, through the combined action of the temperature of the compressed air and of its velocity, that will be sufficient at the radiator outlet to evaporate the soluble fractions of the particles so that they come off the exchange walls.

When the engine runs under low load conditions, EGR valve 48 is opened to allow circulation of part of the exhaust gas to intake manifold 14 after flowing through cooler 46. Simultaneously, the air cooled by passing through radiator 38 is mixed at point 54 with the hot exhaust gas. The air/gas mixture is then cooled by cooler 46 so as to reach the temperature required in intake manifold 14.

Of course, as it is known to the man skilled in the art, radiator 38 as well as cooler 46 are provided with a short-circuit line, 60 and 62 respectively, comprising a throttling means 64 and 66 and a line 68 and 70 for bypassing exchanger 38, 46 to which it is applied. These short-circuit lines are generally used in case of engine cold starting and they therefore have no interdependence with half load or full load operation of the engine.

The present invention is not limited to the examples described and it encompasses any equivalent and variant.

Notably, the feed circuit described above may be applied to a gasoline type internal-combustion engine.

The invention claimed is:

1. A method for feeding at least one fluid to an internal-combustion engine comprising an air supercharging circuit with an outside air compression device, as well as a compressed air cooling radiator and an exhaust gas recirculation circuit with an exhaust gas cooler, wherein the method comprises, for half load and full load running of the engine, passing a part of the compressed air through the compressed air cooling radiator and simultaneously passing another part of the compressed air through the exhaust gas cooler.

2. A method for feeding at least one fluid to an internal-combustion engine as claimed in claim 1, wherein the internal-combustion engine is a diesel type engine.

3. A method for feeding at least one fluid to an internal-combustion engine as claimed in claim 1, the method further comprising, for low load running of the engine, passing air through the compressed air cooling radiator, and passing exhaust gas through the exhaust gas cooler.

4. A feed circuit for feeding at least one fluid to an internal-combustion engine, comprising a circuit for supercharging air to the engine intake, including a supercharging pipe, a supercharging device with a compression stage and a compressed air cooling radiator, as well as a circuit for recirculating the exhaust gas to said engine intake, comprising an exhaust gas recirculation pipe and an exhaust gas cooler, wherein the feed circuit comprises a connecting pipe connecting the exhaust gas recirculation circuit and the air supercharging circuit at a position upstream from the exhaust gas cooler and downstream from the supercharging device, and wherein the connecting pipe connects an upstream region of the compressed air cooling radiator to an upstream region of the exhaust gas cooler.

5. A feed circuit for feeding at least one fluid to an internal-combustion engine, comprising a circuit for supercharging air to the engine intake, including a supercharging pipe, a supercharging device with a compression stage and a compressed air cooling radiator, as well as a circuit for recirculating the exhaust gas to said engine intake, comprising an exhaust gas recirculation pipe and an exhaust gas cooler, wherein the feed circuit comprises a connecting pipe connecting the exhaust gas recirculation circuit and the air supercharging circuit at a position upstream from the exhaust gas cooler and downstream from the supercharging device, wherein the connecting pipe connects an upstream region of the compressed air cooling radiator to an upstream region of the exhaust gas cooler, and wherein the connecting pipe comprises a flow control valve.

* * * * *